United States Patent [19]
Silveyra

[11] 3,970,279
[45] July 20, 1976

[54] MOLD ASSEMBLY FOR PRODUCING MULTI-PARTITIONED CONTAINERS HAVING METAL CONNECTORS THROUGH THE PARTITIONS

[75] Inventor: Salvador Silveyra, Monterrey, Mexico

[73] Assignee: Aislantes Leon, S.A., Monterrey, Mexico

[22] Filed: July 14, 1975

[21] Appl. No.: 595,963

Related U.S. Application Data

[62] Division of Ser. No. 376,867, July 5, 1973.

[52] U.S. Cl. .................................. 249/96; 249/94; 425/123
[51] Int. Cl. ............................................. B29c 6/00
[58] Field of Search .................. 249/83, 84, 85, 91, 249/96, 97; 425/121, 123, DIG. 5, 249

[56] References Cited
UNITED STATES PATENTS

| | | |
|---|---|---|
| 2,339,434 | 1/1944 | Stehlik ............................... 429/123 |
| 2,369,291 | 2/1945 | Frank et al. ....................... 425/123 |
| 2,794,211 | 6/1957 | Brown et al. .................. 425/123 X |
| 3,530,541 | 9/1970 | Burns .............................. 249/97 X |
| 3,564,660 | 2/1971 | Darnell ......................... 425/DIG. 5 |
| 3,767,155 | 10/1973 | Hovorka ....................... 425/123 X |
| 3,767,156 | 10/1973 | Sullivan et al. ................ 425/249 X |
| 3,838,960 | 10/1974 | Lovejoy .......................... 425/249 X |

Primary Examiner—J. Howard Flint, Jr.
Attorney, Agent, or Firm—Alan M. Abrams

[57] ABSTRACT

Multi-partitioned containers such as battery boxes having unitary, one piece metal connectors extending within and through the partitions and a mold assembly for producing such containers.

8 Claims, 10 Drawing Figures

1

MOLD ASSEMBLY FOR PRODUCING MULTI-PARTITIONED CONTAINERS HAVING METAL CONNECTORS THROUGH THE PARTITIONS

This is a division of application Ser. No. 376,867, filed July 5, 1973.

BACKGROUND

Batteries such as lead-acid storage batteries are typically housed within a multi-partitioned container where a plurality of groups are maintained in separate compartments within the container. Conventionally, the individual, adjacent groups within the battery are electrically connected in series by means of intercell connectors or metal straps which usually extend up and over the partitions separating the individual cells. Placing the intercell connectors up and over the partitions presents certain disadvantages, however. For example a relatively long path length is required for the connector which results in the use of excessive quantities of metal and additionally increases the electrical resistance for the connector.

Currently this type of intercell connector construction is being avoided for batteries by placing the connectors directly through the partitions. While placement of the intercell connector directly through the cell partitions is particularly desirable it nevertheless poses a number of problems in manufacturing such containers. Typically, in preparing containers having cell connectors through the partitions, the containers are first prepared by conventional molding techniques with aperture openings adapted for receiving the connectors and formed in the partitions either during the molding or by subsequent punching or drilling. Thereafter, a plurality of separate, preformed portions of the connector are inserted into the aperture-opening followed by a resistance welding of such individual portions to join them together to form a unitary member and to lock the connector into place through the partition. This resistance welding of the connector, however, often results in a change in the physical structure or porosity of the connector surface with the formation of metal oxides and a high internal electrical resistance. This result adversely affects the current carrying capacity of the connector and additionally often ultimately creates a poor bond between the cell plate strap and the surface of the connector when they are subsequently joined by welding in the final manufacture of the battery. Moreover, because the connector is inserted into an aperture in the partition after the partition has been formed by molding, it is typically difficult to obtain a good liquid-tight seal about the connector so as to prevent electrolyte leakage between the adjacent cell compartments separated by the partition. Accordingly, it is often necessary to use expensive adhesives about the connector during the welding operation to obtain the required liquid tight seal.

Therefore, an object of the invention is to provide a mold for a multipartitioned container, having metal connectors extending within and through the partitions which avoids the problems heretofore encountered with such connectors. Another object is to provide a mold for a multi-partitioned battery container having unitary one piece, metal intercell connectors extending through the cell partitions where the connectors have desirable electrical properties and create a fluid-tight seal through the partition. A further object is to provide a mold assembly capable of producing such multi-partitioned containers in a one step procedure and in a highly efficient and economical manner. These and other objects of this invention will be apparent from the following further detailed description thereof as well as from the attached drawings.

IN THE DRAWINGS

Figure 1:
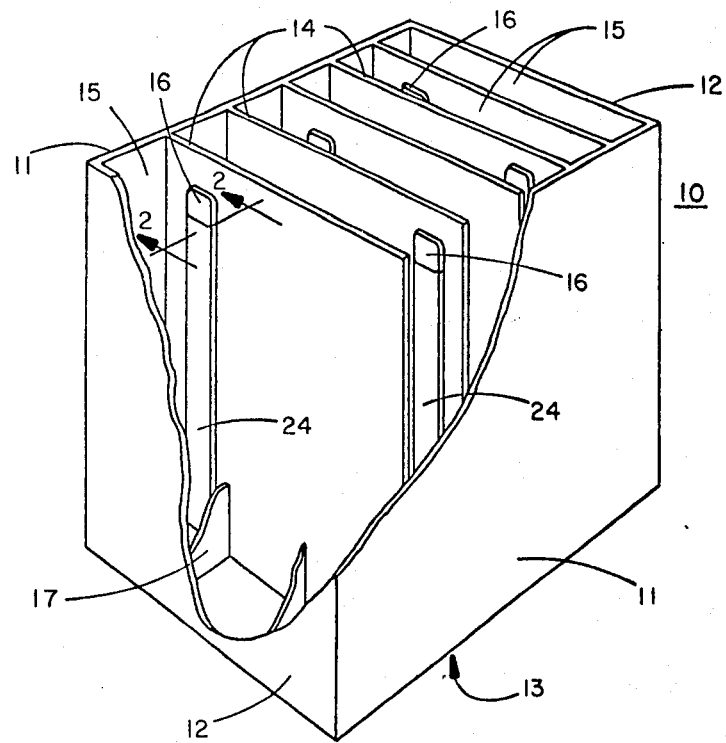
FIG. 1 is a perspective view with sections broken away of a multi-partitioned container, such as a battery box, having intercell connectors extending within and through the cell partitions.
Figures 2, 3:
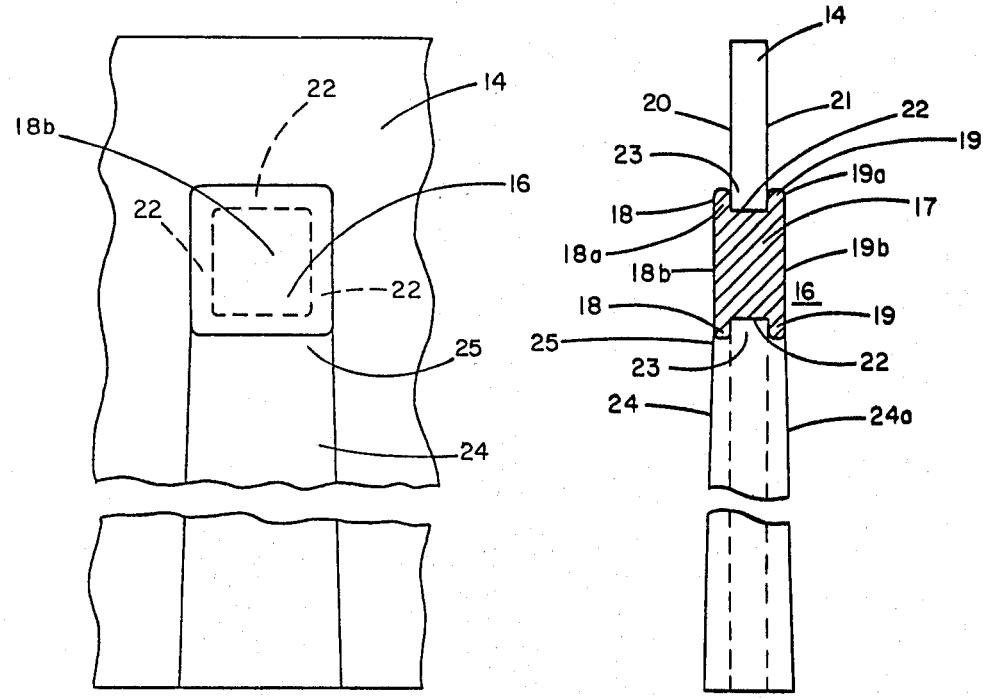
FIG. 2 is enlarged cross section taken along line 2—2 of FIG. 1 showing the connector extending through a partition.
FIG. 3 is a partial frontal elevation view of the connector extending through the partition as shown in FIG. 2.

In general reference to FIGS. 1 to 3 the multi-partition container of this invention and more specifically a battery container having metal intercell connectors through the partitions is illustrated by container 10 of box like construction defined by vertical outer side walls 11 and end walls 12 respectively and a horizontal bottom wall 13. Interior the container 10 are internal partitions 14 extending transversely between the parallel side walls 11 and upwardly from the bottom wall 13 thereby forming individual compartments 15 which serve as the cell compartments for the lead plates and electrolyte (not shown) when container 10 is employed as a battery box container. Extending within and through the partitions 14 are the intercell connectors 16. Reinforcing ribs 17 extend upwardly from the bottom wall 13 and longitudinally between the parallel end walls 12 and serve to support the cell plates (not shown). When utilized as a battery box, container 10 is typically sealed by a top wall or cover (not shown) to fully enclose the cell compartments 15.

As more fully explained hereinafter the metal intercell connector 16 is molded directly into place within and through the partition 14 during the molding preparation of the container 10 so as to achieve a unitary, one piece construction with desirable electrical properties and additionally to provide a fluid tight seal about the connector 16 between the cell compartments 15 separated by the partitions 14. While the connector 16 according to this invention can be of any desired shape or configuration, a particularly suitable configuration is illustrated in FIGS. 2 and 3 with a preferred configuration illustrated in FIGS. 9 and 10. The unitary connector 16 is preferably of rectangular shape with a main body portion 17 generally extending within and through the partition 14 having flared end portions 18 and 19 which in one embodiment extend at their upper portions 18a and 19a laterally over and flush with the adjacent external surfaces 20 and 21 of the partition 14, respectively. This configuration serves to rigidly anchor the connector 16 in place within and through the partition 14. Also and as best illustrated in FIG. 2 in this embodiment the flared end portions 18 and 19 of the connector 16 define therebetween a groove 22 extending about the perimeter of the main body portion 17 of the connector 16 so that during the molding preparation, as more fully described hereinafter, a corresponding portion 23 of the partition 14 extends inwardly inwardly into such groove 22 and thereby firmly locks the connector 16 within the partition 14 and additionally provides a fluid tight seal about the connector 16 to prevent any leakage of electrolyte through the partition 14. This configuration is also particularly suitable in that the faces 18b and 19b of the flared end portions 18 and 19 respectively can adequately serve as contact points for joining the connector 16, usually by welding in typical battery construction, to a cell plate strap (not shown) to provide the electrical contact with the cell plates (not shown) within the compartments 15.

As a preferred embodiment for the container 10 and as best illustrated in FIGS. 2 and 3 while the metal intercell connector 16 is held in a firmly locked position within and through the partition 14 by means of the flared end portions 18 and 19 and groove 22 such connector 16 is preferably and advantageously supported in such position by a projecting column 24 of the partition 14. Projecting column 24 is integral with and extends outwardly from the partition 14 a distance sufficient so that its upper surfaces 25 and 26 are flush with the flared ends 18 and 19 of the connector 16, respectively. As more fully explained hereinafter, this projecting column is formed during the molding preparation according to this invention and serves to add additional structural strength to the partition 14 for supporting the metal intercell connector 16. This permits the partition 14 to be made relatively thin so as to maximize the available interior space of the cell compartments 15 for holding additional electrolyte and cells plates (not shown). While the projecting column 24 is shown in FIG. 2 in a preferred arrangement with a corresponding, projecting column 24a on the opposite side of the partition 14, it should be understood that if desired the projecting column 24 can be positioned on only one side of the partition 14. As further shown in FIGS. 2 and 3, the projecting column 24 has a generally rectangular cross section and extends downwardly below the connector 16 generally to the point where the partition 14 joins the bottom wall 13 of the container 10. Preferably, the projecting column 24 is tapered in pyramid fashion with the greatest cross section being at the lowest portion of the column 24 and the smallest cross section being at the highest portion of such column 24.

Container 10 as shown in FIG. 1 is, of course, merely illustrative of the type of multi-partitioned containers which may be prepared according to this invention with the metal intercell connectors 16 extending directly through the partitions 14. Container 10 moreover can be fabricated from a diversity of materials and typically any of the thermally deformable or moldable materials such as hard rubber or polyolefins, for example polypropylene, which are conventionally used in the compression of injection molding of battery containers, may be effectively employed. The metal intercell connectors 16 may be fabricated of any suitable metal and preferably is lead or a lead alloy containing for example antimony. The number of such metal intercell connectors 16 can be varied although typically, one connector is employed for each partition 14 so as to join in series the positive plates of one cell to the negative plates of the adjacent cell. For example as illustrated in FIG. 1 a conventional six cell battery container 10 is shown having six cell compartments 15 with five partitions 14 each having one intercell connector 16 therethrough.

As more fully explained hereinafter the metal connector 16 is molded directly in place within and through the partition 14 in a one step molding procedure utilizing the mold assembly of this invention. This allows the metal connector 16 to be formed prior to the molding of container 10 by casting for example and after formation molded within the partition 14 as a unitary, one piece structure. This procedure avoids the conventional resistance welding of a plurality of intercell connector portions and thus the unitary connectors 16 of this invention do not have the increased internal resistance or metal oxides usually associated with such welded intercell connectors. They thereby retain excellent electrical properties after being molded within and through the partition 14. Moreover, by molding the connectors 16 directly into place, particularly with the preferred connector configuration as later described, the connector 16 creates an excellent fluid-tight seal through the partition 15 to prevent electrolyte leakage between the adjacent cell compartments.

Figure 4:
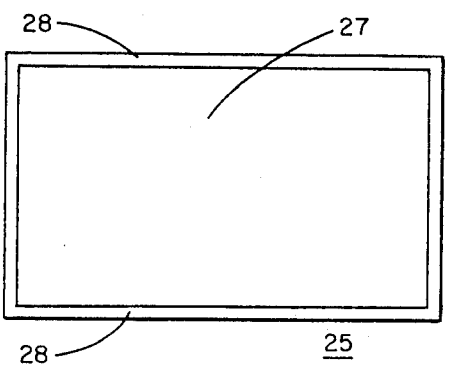
FIG. 4 is a top view of cavity member embodied in the mold assembly of this invention.

The mold assembly of this invention for preparing the container 10 is illustrated, as a basic embodiment in FIGS. 3 and 4 and essentially comprises in combination a cavity member 25 and a core member 26 which cooperate in molding operation under elevated heat and pressure to form the container 10 from a suitable moldable material as previously described. The cavity member 25 and core member 26 can be of any conventional construction as typically found in a compression or injection molding press (not shown) used to prepare multi-partitioned containers. Accordingly, unnecessary details of such conventional mold assembly unrelated to the present invention or its understanding, for example stripper rings, ejection plates or heating elements, have been omitted in FIGS. 3 and 4 for purposes of simplicity. Basically, the cavity member 25 comprises a bottom plate 27 and side restraining walls 28 which can be stationary or movable to a fixed position during the molding cycle to provide the positive restraining resistance to the molding pressures. The core member 26 of FIG. 5 is adapted for insertion into the cavity member 25 and is designed and dimensioned to shape the container 10 from the moldable material placed into the cavity member 25 prior to insertion of the core member 26.

Core member 26 in simplest arrangement comprised a back plate 30 to which a plurality of depending core segments 31 are fixedly connected at their upper portions. As illustrated in FIG. 5 the core segments 31 are disposed from one another in conventional fashion to provide a series of transversely extended spaces 32 within which the partitions 14 of the container 10 are formed. The side walls 11 and end walls 12 are formed within the mold assembly in the clearance space between the core segments 31 (FIG. 5) and the restraining walls 28 (FIG. 4) of the cavity member 25. The bottom wall 13 of container 10 is similarly formed in conventional fashion within the clearance provided between the free ends 33 (FIG. 5) of the core segments 31 and the bottom plate 27 of the cavity member 25. The core segments 31 are also provided with longitudinally extending apertures 34 which are adapted to shape the reinforcing ribs 17 of container 10 during the molding preparation.

Figure 5:
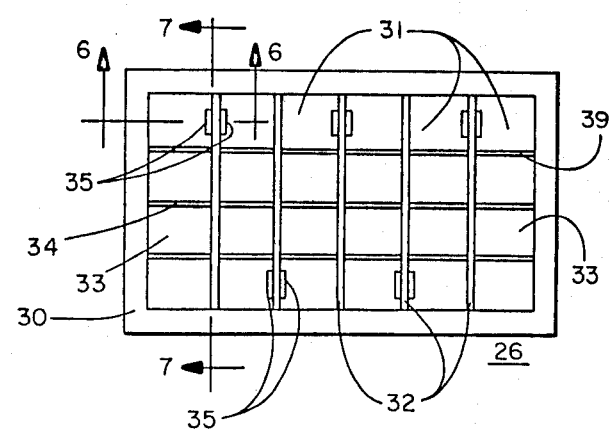
FIG. 5 is a bottom view of a core member embodied in the mold assembly of this invention and adapted for receipt into the cavity member of FIG. 4 showing depending core segments for forming the walls and partitions of the container of FIG. 1 where such core segments have slots for receiving the metal connectors illustrated in FIGS. 2 and 3.
Figure 6:
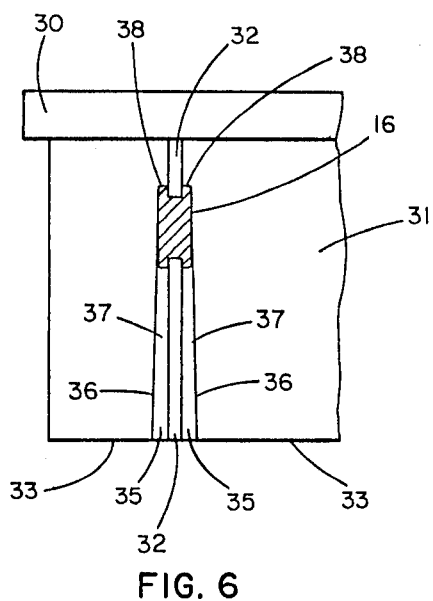
FIG. 6 is an enlarged cross section taken along line 6—6 of FIG. 5 illustrating adjacent core segments having a pair of corresponding slots for jointly receiving the metal connector of FIGS. 2 and 3 and further illustrating a connector held in place within such slots.
Figure 7:
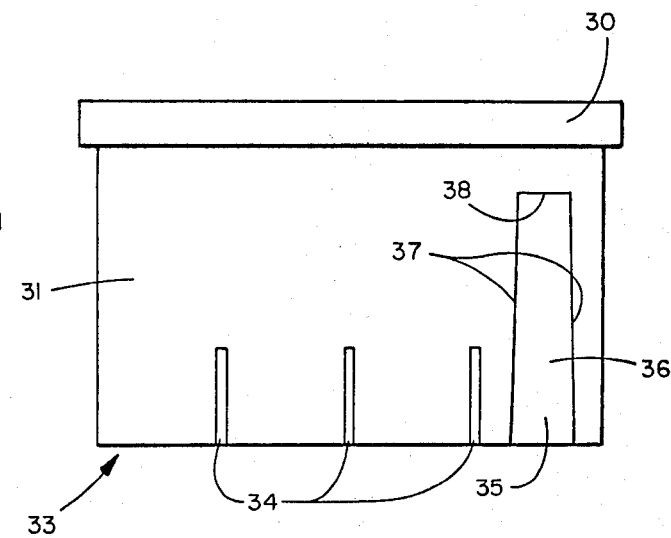
FIG. 7 is an enlarged elevation view of a core segment taken along line 7—7 of FIG. 5 showing a slot for receiving the connector of FIGS. 2 and 3.

As shown particularly in FIGS. 4 to 6 the core segments 31 are equipped with an elongated slot 35 which projects inwardly into the core segment 31 and is generally defined by a back wall 36 and side walls 37 as best shown in FIGS. 6 and 7. The slot 35 extends upwardly from the free end 33 of the core segment 31 and is adapted to receive and hold the metal intercell connector 16 during the molding preparation. FIG. 6 illustrates such arrangement with a metal connector 16 held in place within a slot 35 prior to molding. The slot 35 is generally of rectangular cross section and preferably is tapered in pyramidal fashion along its height so that the largest cross section or widest part occurs at the lower portion and the smallest cross section or narrowest part occurs at the upper or top portion of the slot 35. This tapering of the slot 35 permits ready insertion of the connector 16 into the slot 35 at its lowest point at the free end 33 and serves to hold the connector 16 by a pressure or wedging action at its highest point between the tapered back and side walls 36 and 37, respectively. This tapering of the slots 35 further permits a more ready removal of the molded partitions 14 from the core member 26 after molding.

Generally the tapering of the slot 35 is achieved by slanting either the back wall 36 or the side wall 37 or both and generally such slanting ranges from about 1 to 6° or more usually about 2°. As indicated, the tapering will effect a slight wedging of the connector 16 when inserted upwardly into the slot 35. This wedging action however is generally not sufficient to securely hold the connector 16 in place during molding. Adequate holding of the connector 16 is however achieved according to this invention by heating the core segments 31 so as to cause the metal connector 16 to thermally expand and thereby become locked within the slot 35 sufficiently to hold the connector 16 in place during molding. Not only does the expansion of the connector 16 hold the connector 16 in place during molding but such expansion also serves to prevent any of the moldable material from flowing between the connector 16 and the slot back wall 36 (FIG. 6) so as to cover the face 18b (FIG. 3) of the connector 16 with the moldable material. Normally sufficient expansion of the connector 16 will occur when the core segments 31 are maintained by heating elements (not shown) within a temperature range of about 100° to about 250°C, at the start of the molding cycle particularly when using lead as the connector metal.

As shown best in FIGS. 5 and 6 and in a particularly preferred feature of this invention, adjacent core segments 31 have a corresponding pair of slots 35 which allows such pair of slots 35 to act jointly together in receiving and holding the connector 16 during molding. While it is possible to employ only one slot 35 in one core segment 31 to receive and hold the connector 16, the employment of a pair of corresponding slots 35 in adjacent core segments 31 is highly preferred as it provides for better positioning of the connector 16 and it enables the projecting columns 24 and 24a of the partition 14 (FIG. 2) to be formed on both sides of such partition 14. The slots 35 preferably terminate at a shoulder section 38 (FIG. 7) which provides an automatic stop for the connector 16 when it is inserted into the slot 35. This shoulder section 38 is designed moreover to positively position the connector 16 at the appropriate height in the slot 35 corresponding to the desired height of the connector 16 in final molded partition 14.

Figure 8:
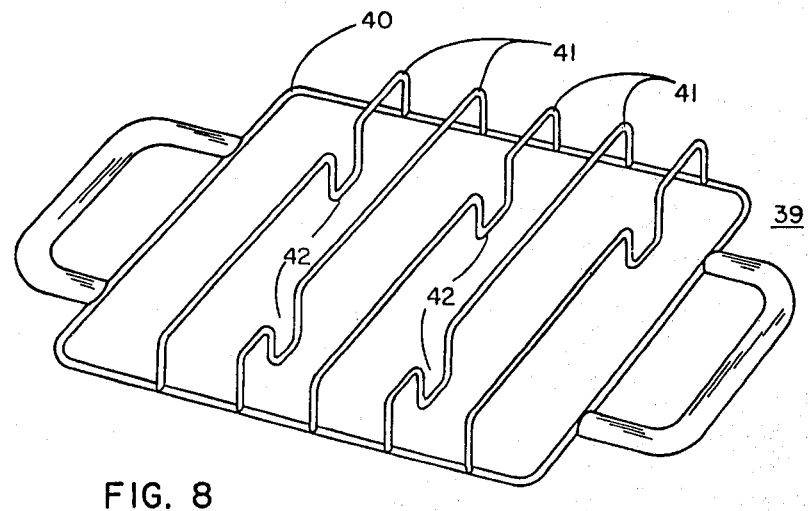
FIG. 8 is a perspective view of jig arrangements for inserting a plurality of the metal connectors shown in FIGS. 2 and 3 into the slots of the core segments shown in FIG. 5.

In the molding preparation of the container 10 utilizing the mold assembly of this invention, the basic procedure essentially involves first inserting preformed and preferably cast lead connectors 16 into the slots 35 of the core segments 31. This may be done in a variety of different ways and suitably one method comprises placing the connectors 16 on a guide loading arrangement such as jig 39 illustrated in FIG. 8. Jig 39 essentially comprises a generally rectangular frame 40 with transverse rods 41 each having formed therein a holding section 42 adapted to receive and hold the connectors 16. As illustrated in FIG. 8 there are five holding sections 42 to hold five connectors 16 for insertion into the five pairs of corresponding slots 35 of the core segments 31. The number of holding sections 42 will vary of course depending upon the number of core segments 31 used for the core member 26 which in turn relate to the number of partitions 14 formed and hence the number of cell compartments 15 created in the container 10. For example, if only 3 compartments 15 are desired for the container 10 then core member 26 would have only three core segments 31 and the jig 39 would only have two rods 41 each with one holding section 42 for insertion of two connectors 16.

The dimensions of the rods 41 of the jig 39 are designed so that they may readily fit into the transverse spaces 32 between the adjacent core segments 31 of the core 26 and the holding sections 42 are so positioned upon such rods 41 that the holding sections 42 will align with the slots 35 in the core segments 31. In this regard the transverse spaces 32 are generally designed so that the partitions 14, when molded from hard rubber for example, will have a thickness of about 0.16 inches and the connector 16 molded into such partition 14 generally will have a thickness of about 3/16 inches with a width of about 15/16 inches and a height of about 12/16 inches. After inserting connectors 16 into the holding sections 42, the jig 39 is raised upwardly, either manually or automatically, into the core member 26 so that the connectors 16 are guided upwardly within the slots 35 until they reach the shoulder section 38 and become wedged thereat within the tapered slots 35. In such position the heated core segments 31 causes the connectors 16 to expand and become firmly locked within the slots 35. The jig 39 is then lowered downwardly and removed from the core member 26 leaving the connectors 16 held in place within the slots 35 and ready for molding into the partitions 14. The core member 26 with the connectors 16 securely held in place within the slots 35 of the core segments 31 is thereupon placed into the cavity member 25. If the molding involves a compression type, an appropriate quantity of moldable material, for example, hard rubber is first changed into the cavity member 25 prior to insertion of the core member 26. If the molding involves an injection type, the core member 26 is first inserted into the cavity member 25 followed by injection of the moldable material, for example, polypropylene into the closed mold assembly. During the molding, the moldable material (not shown) flows into the spaces 32 between the adjacent core segments 31 to form the partitions 14. As the moldable material flows into the space 32, it flows around and about the connector 16 filling the groove 32 so that the connector 16 becomes firmly locked within and through the partition 14. Also as the moldable material flows into the space 32 it fills the slots 35 below the connector 16 thereby creating the projecting columns 24 and 24a of the partition 14 which as previously mentioned serve to strengthen the partition 14 in supporting the connector 16.

The molding is continued under application of appropriate heat and pressure until the moldable material has reached the desired rigid or cured state. Thereupon the core member 26 is removed from the cavity member 25 and the molded container 10 is recovered with the one piece, unitary connectors 16 molded within and through the partitions 14 to provide a connector 16 of excellent electrical properties and creating a fluid tight seal through the partition 14. When the container is used as a battery box, cell plates are then placed into the compartments 15 and are joined to the connectors 16 by conventional welding techniques.

Figure 9:
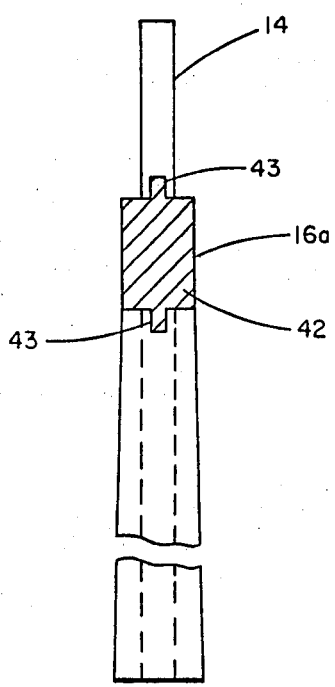
FIG. 9 is a view similar to FIG. 2 and is an enlarged cross section taken along line 2—2 of FIG. 1 showing a preferred configuration of the connector extending through the partition.
Figure 10:
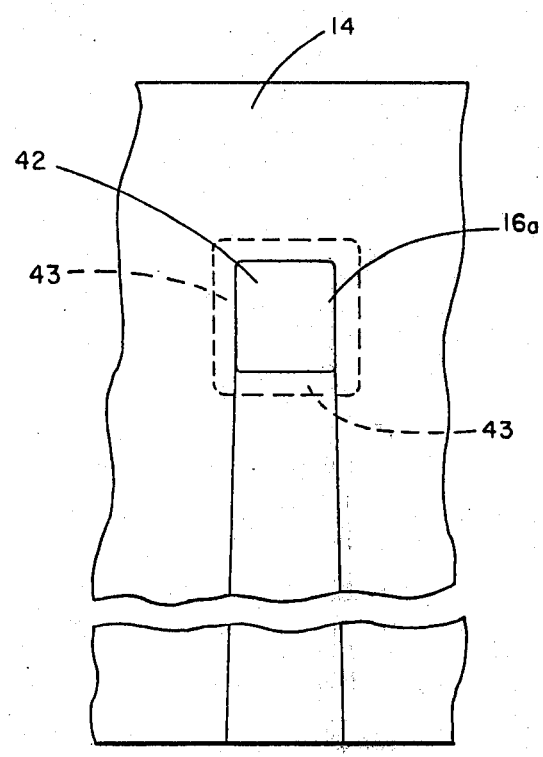
FIG. 10 is a view similar to FIG. 3 and is a partial frontal elevation view of the preferred configuration of the connector extending through the partition as shown in FIG. 9.

When the container 10 is so used as a battery box, it is preferred that the terminal 16 have the configuration of the terminal 16a as generally illustrated in FIGS. 9 and 10 particularly so as to provide desirable locking of the terminal 16a with the partition 14 and especially so as to provide a fluid tight seal about the connector 16a between the adjacent compartments 15 of the container 10.

In this preferred configuration the unitary connector 16a is suitably of rectangular and preferable square shape with a main body portion 42 generally extending within and through the partition 14. The main portion 42 has a fin or tab portion 43 which extends outwardly from and around the perimeter of the main portion 42. This fin or tab portion 43 has a width smaller than the width of the main body portion 42 and as it extends laterally into the partition 14 such tab portion 43 serves to securely lock the terminal 16a within and through the partition 14 and most significantly serves also to provide an excellent fluid tight seal about the connector 16a by providing a labyrinthian path for any leaking electrolyte through the partition 14. The actual dimensions employed for this preferred connector 16a can be varied and for illustrative purposes a suitable connector 16a would have a main body height and width of about 0.75 inches (19.1mm) and about 0.202 inches (5.1mm) respectively with the tab portion having a height and width of about 0.189 inches (4.8mm) and about 0.063 inches (1.6mm), respectively.

In the above description of the invention, it should be understood that the preferred embodiments are described for purposes of illustration and description only. Description of these preferred embodiments is not intended to limit the invention to the precise form or arrangements discussed. These embodiments are chosen in order to conveniently explain the principles of the invention and their application in practical use so as to enable those skilled in the art to utilize the invention in various embodiments and modifications as are best adopted to the particular use contemplated.

I claim:

1. A mold assembly adapted for molding mult-partitioned containers from a moldable material and having enclosing sides and bottom walls and at least one internal partition dividing the container into a plurality of independent compartments where such partition has a metal connector extending within and through the partition to provide electrical conduction between adjacent compartments of the container which comprises in combination a core member and a cavity member for receiving the core member, such core member having a plurality of depending core segments where at least one of the core segments has a elongated slot extending upwardly from the bottom of the core segment and adapted to receive and hold the metal connector during the molding of the container so that upon completion of the molding, the metal connector is lock molded into the desired position within and through the partition and providing a fluid tight seal about the metal connector.

2. The mold assembly of claim 1 wherein a second core segment adjacent the first slotted core segment has a corresponding elongated slot also adapted to receive the metal connector and to act jointly with the first slotted core segment in holding the metal connector in place during molding.

3. The mold assembly of claim 2 wherein the elongated slot has a generally rectangular cross section and is tapered along its height so that the metal connector can be readily inserted at the lowest and widest part of the slot and be securely held at the highest and narrowest part of the slot by a wedging action.

4. The mold assembly of claim 3 wherein the core segment is heated so that the metal connector thermally expands and thereby becomes securely held by such expansion within the slot.

5. The mold assembly of claim 1 wherein the elongated slot terminates in a shoulder section with such shoulder section being at a height in the core segment corresponding to the desired height of the metal connector in the molded partition so that upon insertion of the connector into the slot, the shoulder section will automatically stop the slot at the desired position.

6. The mold assembly of claim 1 wherein the elongated slot shapes the moldable material during molding into a projecting column integral with and extending outwardly from the partition and downwardly below the connector so as to add structural strength to the final molded partition in supporting the connector.

7. The mold assembly of claim 1 wherein the core member is associated with a jig arrangement for inserting a plurality of connectors simultaneous into the slots of the core segments.

8. The mold assembly of claim 7 wherein the jig arrangement comprises a generally rectangular frame supporting a plurality of transversely extending rods where such rods have holding sections formed therein for holding the connectors during insertion, said holding sections being arranged to align with the slots in the core segments when the jig arrangement is raised upwardly to insert the connectors.

* * * * *